United States Patent [19]
Damman et al.

[11] Patent Number: 5,612,813
[45] Date of Patent: Mar. 18, 1997

[54] OPTICAL ISOLATOR, CIRCULATOR, SWITCH OR THE LIKE, INCLUDING A FARADAY ROTATOR

[75] Inventors: Hans Damman, Tangstedt; Elke B. Pross, Hamburg; Gert Rabe, Pinneberg; Wolfgang F. M. Tolksdorf, Tornesch, all of Germany

[73] Assignee: U.S. Philips Corporation, New York, N.Y.

[21] Appl. No.: 389,433

[22] Filed: Feb. 15, 1995

Related U.S. Application Data

[63] Continuation of Ser. No. 124,524, Sep. 20, 1993, abandoned, which is a continuation of Ser. No. 1,941, Jan. 8, 1993, abandoned, which is a continuation of Ser. No. 725,367, Jun. 27, 1991, abandoned, which is a continuation of Ser. No. 378,344, Jul. 11, 1989, abandoned.

[30] Foreign Application Priority Data

Jul. 23, 1988 [DE] Germany ............................ 38 25 079.9

[51] Int. Cl.$^6$ ................................. G02F 1/09; G02B 5/30
[52] U.S. Cl. .......................... 359/281; 359/282; 359/484; 359/501; 372/703; 385/6; 385/11
[58] Field of Search ..................................... 350/370, 371, 350/372, 375, 376, 377, 407, 96.12, 96.13, 96.14, 386, 387, 388, 389; 372/703; 359/280, 281, 282, 283, 284, 324, 483, 484, 501; 385/6, 11, 146

[56] References Cited

U.S. PATENT DOCUMENTS

| | | | |
|---|---|---|---|
| 4,384,760 | 5/1983 | Alferness | 350/96.14 |
| 4,522,473 | 6/1985 | Hibiya et al. | 350/377 |
| 4,560,932 | 12/1985 | Mitsui et al. | 359/324 |
| 4,671,621 | 6/1987 | Dillon, Jr. et al. | 350/403 |
| 4,728,178 | 3/1988 | Gualtiers et al. | 359/282 |
| 4,756,607 | 7/1988 | Watanabe et al. | 350/375 |
| 4,762,384 | 8/1988 | Hegarty et al. | 350/403 |
| 4,798,434 | 1/1989 | Dammann et al. | 350/375 |
| 4,856,878 | 8/1989 | Wilson et al. | 350/375 |
| 4,859,013 | 8/1989 | Schmitt et al. | 385/6 |
| 4,886,332 | 12/1989 | Wolfe | 359/484 |
| 4,893,890 | 1/1990 | Lutes | 350/375 |
| 5,101,469 | 3/1992 | Oda | 385/11 |

FOREIGN PATENT DOCUMENTS

| | | | |
|---|---|---|---|
| 0076321 | 6/1980 | Japan | 350/376 |
| 61-292613 | 12/1986 | Japan | 350/375 |
| 0073227 | 4/1987 | Japan | 350/402 |
| 0118315 | 5/1987 | Japan | 372/703 |
| 0049728 | 3/1988 | Japan | 350/407 |
| 0142320 | 6/1988 | Japan | 350/375 |
| 0267912 | 11/1988 | Japan | 350/370 |

OTHER PUBLICATIONS

"Yttrium Iron Garnet Single–Mode Buried Channel Waveguides For Waveguide Isolators" E. Pross et al., Appl. Phys. Lett. 52 (9) Feb. 29, 1988.
"Optics" Hecht and Zajac, (Addison–Wesley 1979) pp. 261–263.
Kampel, "A YIG Radiometer and Temperature Controller"; Wireless World; Oct. 1970; pp 501–504.

*Primary Examiner*—Ricky D. Shafer
*Attorney, Agent, or Firm*—Leroy Eason

[57] ABSTRACT

Optical isolator, circulator, switch or the like, including a Faraday rotator to which a magnetic field is applied which is oriented along the direction of propagation of light and which is arranged between a preceding polarization filter and a succeeding polarization filter whose planes of polarization enclose an angle with respect to each other such that light can only traverse in one direction, the Faraday rotator having different propagation constants $\beta_{TE}$ and $\beta_{TM}$ in a TE plane and a TM plane, respectively. The elaborate technique for adapting the propagation constants of the TE wave and the TM wave is mitigated in that the TE plane of the Faraday rotator is aligned in such a way that it extends between the planes of polarization of the polarization filters.

9 Claims, 1 Drawing Sheet

OPTICAL ISOLATOR, CIRCULATOR, SWITCH OR THE LIKE, INCLUDING A FARADAY ROTATOR

This is a continuation of application Ser. No. 08/124,524, filed on Sep. 20, 1993, now abandoned which is a continuation of application Ser. No. 08/001,941, filed Jan. 8, 1993, now abandoned, which is a continuation of Ser. No. 07/725,367, filed Jun. 27, 1991, now abandoned, which is a continuation of Ser. No. 07/378,344 filed Jun. 11, 1989, now abandoned.

The invention relates to an optical isolator, circulator, switch or the like, including a Faraday rotator to which a magnetic field is applied which is oriented along the direction of propagation of light and which is arranged between a preceding polarization filter and a succeeding polarization filter whose planes of polarization enclose an angle with respect to each other such that light can only traverse in one direction, the Faraday rotator having different propagation constants $\beta_{TE}$ and $\beta_{TM}$ in a TE plane and a TM plane, respectively.

In a Faraday rotator consisting of deposited crystalline layers, anisotropies caused by manufacturing conditions are inevitable. For example, stress-induced differences between refractive indices are produced. Such anisotropies result in a magneto-optical waveguide exhibiting in known manner two distinct optical planes, namely the so-called TM plane (transversally magnetic) and the so-called TE plane (transversally electric).

In a waveguide consisting of layers the TE plane extends in the plane of the layers. In a strip waveguide, which is manufactured by means of crystalline deposition processes, the TE plane may also extend to the substrate plane at an angle of inclination of several degrees. The exact orientation of the TE plane in a magneto-optical crystal can be determined in known manner by means of measuring techniques. It can be influenced by different anisotropic effects which result in the propagation constants and phase rates of a TE wave and a TM wave being unequal.

Applied Physics Letters 1986, pp. 1755 to 1757 or Applied Physics Letters 1988, pp. 682 to 684 describe arrangements of the type mentioned in the opening paragraph. In these publications it was pointed out that the difference $\Delta\beta=\beta_{TM}-\beta_{TE}$ of the propagation constants for TM waves and TE waves should preferably assume the "zero" value. Otherwise a linearly polarized entering wave would leave the Faraday rotator as an elliptically polarized wave. However, a very good optical isolation can only be achieved if a linearly polarized wave is also produced at the output of the rotator, which wave is perpendicular to the plane of polarization of the then blocking polarization filter.

The adjustment of a value $\Delta\beta=0$, either by means of special manufacturing techniques or by means of subsequent adjustment using, for example, externally applied mechanical stress if elaborate.

SUMMARY OF THE INVENTION

It is an object of the invention to mitigate the elaborate techniques of adapting the propagation constants of the TE wave and the TM wave.

This object is reached in that the TE plane of the Faraday rotator is aligned in such a way that it extends between the planes of polarization of the polarization filters.

The invention is based on the recognition that the condition $\Delta\beta=0$ (phase matching) is not required if the TE plane of the Faraday rotator is suitably arranged between the planes of polarization of the polarization filters.

A distinct angle $\alpha$ between the TE plane of the Faraday rotator and the plane of polarization of the preceding polarization filter can be found—for example, by trial—at which angle a linearly polarized wave is produced at the output of the Faraday rotator, despite $\Delta\beta\neq0$.

According to the invention, a desired angle $\alpha$ can be found at given values for the coupling constant K, corresponding to the specific Faraday rotation, and for the propagation constants $\beta_{TM}$ and $\beta_{TE}$ by an appropriate choice of the magneto-optically effective length L such that the plane of polarization of the polarization filter preceding the Faraday rotator in the blocking direction is rotated with respect to the TE plane by an angle $\alpha$ which is determined approximately according to the following equation:

$$tg2\alpha = \frac{K}{\sqrt{K^2 + \left(\frac{\Delta\beta}{2}\right)^2}} \cdot tg(L \cdot \sqrt{K^2 + (\Delta\beta/2)^2});$$

with:
K=coupling constant in degrees cm$^{-1}$
$\Delta\beta=\beta_{TM}-\beta_{TE}$ in degrees·cm$^{-1}$
L=magneto-optically effective length of the Faraday rotator in ·cm,
and that the angle between the planes of polarization of the polarization filters is chosen to be such that the plane of polarization of the succeeding polarization filter is perpendicular to the plane of polarization of the preceding polarization filter, after this plane of the preceding filter has been rotated by the Faraday rotator, whereby the light leaving the Faraday rotator is blocked by the succeeding filter. Two equivalent angles $\alpha$, which differ 90° from each other, are then obtained. The possible values $\alpha+90°$ is not specifically referred to hereinafter.

Both a very good isolator effect in one direction and a low-attenuation light passage in the other direction can be achieved in that at given values of K and $\Delta\beta$ the nominal length L of the Faraday rotator is chosen to be such that the angle between the plane of polarization of the preceding polarization filter in the blocking direction and the TE plane of the Faraday rotator has a value of between approximately 20° and approximately 25°, in the ideal case 22.5°. In the ideal case a non-reciprocal phase rotation of the plane of polarization of the light results at $\alpha=22.5°$ when passing through the Faraday rotator at 45°. The planes of polarization of the polarization filters are then rotated 45° with respect to each other. For example, polarized laser light can pass through the isolator with only small losses in one direction, but in the other direction no reflection light can be passed back into the laser, as is also the case with an isolator having a bulk crystal ($\Delta\beta=0$) (compared also "Physik in unserer Zeit" (1987, pp. 130 to 136). The smaller the ratio $|\Delta\beta/K|$, the smaller the losses. For $|\Delta\beta/K|\leq\frac{1}{2}$, for example, losses of maximally 11% are obtained. Values $|\Delta\beta/K|\leq\frac{1}{2}$ can be achieved without too many difficulties in the manufacture of waveguides. Since ideal nominal data—whether they are geometrical dimensions, crystal data, manufacturing parameters, angle pre-adjustments—can never be realised with absolute precision, it is very advantageous that at least one of the polarization filters is rotatable with respect to the Faraday rotator for optimum adjustment of the isolation. The magneto-optically effective length L can then be dimensioned in such a way that at least approximately a nominal angle $\alpha$ of 22.5° is achieved. In the case of tolerance deviations the preceding polarization filter in the isolation direction is rotated with respect to the Faraday rotator (or conversely) until a linearly polarized wave is measured at the output of the Faraday rotator. Subsequently the plane of polarization of the other polarization filter is rotated perpendicularly to the plane of polarization of the output light. Generally, an ideal isolation cannot be obtained simultaneously with a minimally attenuated light passage in the reverse direction but a negligibly small additional attenuation of, for example, 2% is produced.

In the arrangement according to the invention manufacturing tolerances, particularly in the range of an optimum nominal angle $\alpha=22.5°$ have a lesser effect as $\Delta\beta$ is smaller. An adjusting approximation of the optimum effect of isolation is then simplified.

Since very small values for $\Delta\beta$ can be achieved with strip waveguides, their use for isolators according to the invention is advantageous. Very small values for $\Delta\beta$ can be achieved in that the strip waveguide is manufactured by depositing crystal layers on a substrate layer, etching away the regions of a magneto-optical crystal layer which are present beside a covering mask and subsequently depositing a cladding layer, the width of the mask being chosen in the range between approximately 5 and approximately 20 µm.

BRIEF DESCRIPTION OF THE DRAWINGS

The invention will now be described in greater detail with reference to the accompanying drawing in which.

DETAILED DESCRIPTION OF THE PREFERRED EMBODIMENTS

Figure 1:
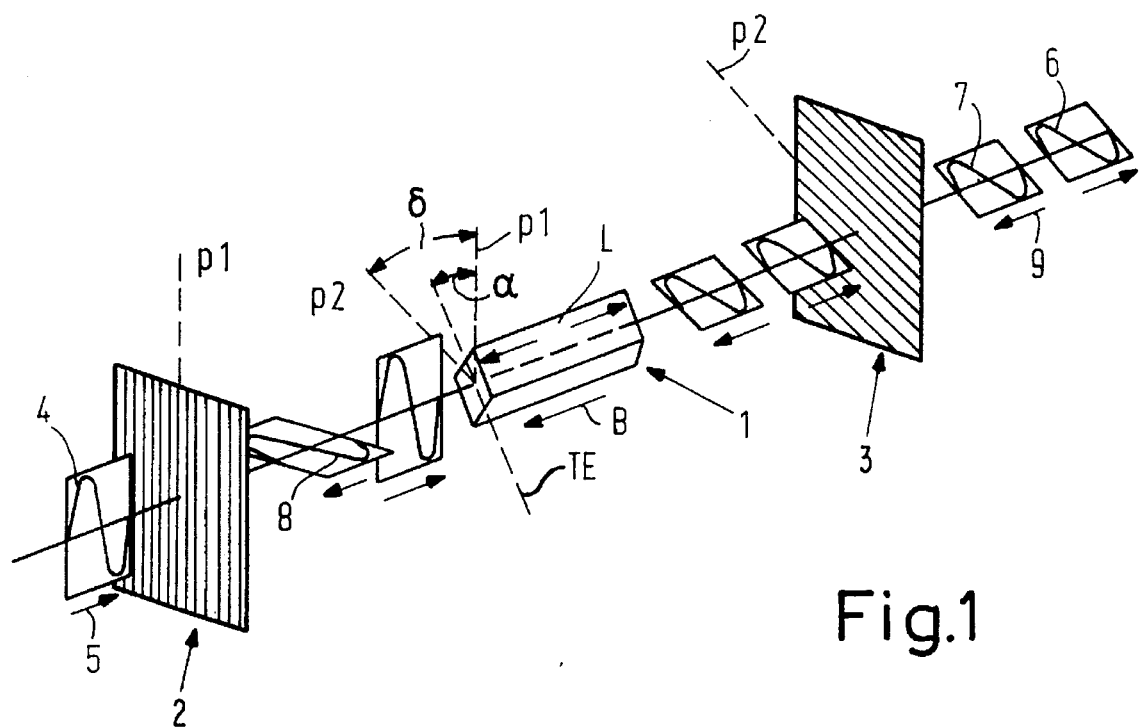
FIG. 1 shows the basic structure of an optical isolator according to the invention.

The optical isolator shown in a perspective view in FIG. 1 comprises a Faraday rotator 1 to which a magnetic field B is applied, an input polarization filter 3 and an output polarization filter 2. The magneto-optically effective length L of the Faraday rotator 1 as well the associated angles of the components are chosen to be such that an entering polarized light wave 4 in the pass direction 5 leaves the isolator with low losses as an output wave 6, which light wave has a plane of polarization which is rotated 45° and is adapted to the direction of polarization p2 of the polarization filter 2.

A portion 7 of the output wave 6 is reflected into the isolation direction 9 and is rotated once more 45° in the non-reciprocal Faraday rotator 1 to results in a wave 8 with a polarization in a plane perpendicularly to the direction of polarization p1 of the polarization filter 3. The wave 8 is therefore blocked by the polarization filter 3. In this optimum configuration shown the directions p1 and p2 of the planes of polarization of the polarization filters 2 and 3 are inclined relative to each other by $\delta=45°$.

This angle $\alpha$ is halved by the TE direction TE of the Faraday rotator 1 (60 =22.5°).

The magneto-optically effective length L of the Faraday rotator 1 is then defined by the following equation:

$$tg2\alpha = \frac{K}{\sqrt{K^2 + \left(\frac{\Delta\beta}{2}\right)^2}} \cdot tg(L \cdot \sqrt{K^2 + (\Delta\beta/2)^2}\ ).$$

However, if the length L deviates from this optimum value due to manufacturing conditions, the angle $\alpha$ can be adjusted in such a way that a linearly polarized wave in the isolation direction 9 leaves the Faraday rotator corresponding to the oreintation 8, which wave is then completely blocked by the polarization filter 3 if this filter is adjusted in an appropriate position. An input wave 4 traversing the Faraday rotator in the pass direction 5 is then, however, elliptically deformed to a slight extent. Accordingly, a small intensity portion is not passed by the polarization filter 3. The losses in the pass direction 5 are the smaller as the angle $\alpha$ is closer to the value of 22.5°. Deviations from the optimum value $\alpha=22.5°$ have a lesser effect if the difference $\Delta\beta$ of the propagation constants $\beta_{TM}$ and $\beta_{TE}$ is small. Consequently a magneto-optical strip waveguide of the type shown in FIG. 2 has proved to be very suitable.

Figures 2A, 2B, 2C:
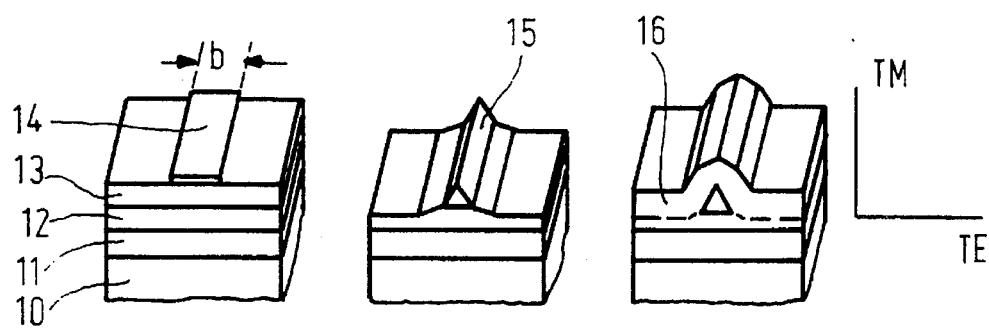
FIG. 2 shows the manufacturing stages a, b and c of a magneto-optical strip waveguide which is very advantageous for the invention.

The following layer structure was realised by crystalline deposition in the stage illustrated in FIG. 2a (with layer thicknesses according to Applied Physics Letters 1988, pp. 682–684): substrate layer 10, absorption layer 11, cladding layer 12 and magneto-optical layer 13. The magneto-optical layer 13 was covered with a mask 14 and a structure according to FIG. 2b was made in an etching process in which the strip 15 of the magneto-optical layer 13 was left over. A further cladding layer 16 was deposited thereon so that the magneto-optical strip waveguide of FIG. 2c was obtained. When symmetrically depositing the crystal layers, the TE plane is generally parallel to the plane of the layers and the TM plane is perpendicular thereto.

The magneto-optical strip waveguide according to FIG. 2c is eminently suitable as a Faraday rotator 1 according to FIG. 1. The choice of the mask width b between 5 and 20 µm results in very low values of $\Delta\beta$.

The low invention has been described with reference to an optical isolator. With such an element it is of course also possible for those skilled in the art to construct optical circulators, optical switches or similar elements. If necessary, the magnetic field may be switched off or its direction may be reversed.

We claim:

1. An optical device comprising:

a Faraday rotator arranged along an optical axis of propagation and having an identifiable TE plane, a propagation constant $\beta_{TE}$ in the TE plane and a propagation constant $\beta_{TM}$ in a TM plane, the constants $\beta_{TE}$ and $\beta_{TM}$ being unequal;

a polarization filter preceding the Faraday rotator for a forward direction of propagation along said axis and having a first plane of polarization; and a polarization filter succeeding the Faraday rotator for said forward direction of propagation along said axis and having a second plane of polarization, said second plane forming an angle $\delta$ with said first plane of polarization;

the TE plane of the Faraday rotator being oriented at an angle $\alpha$ with respect to the first plane or polarization and $0<\alpha<\delta$;

the angle $\delta$ between the planes of polarization of the polarization filters being such that the first plane is perpendicular to the plane of polarization of light leaving the Faraday rotator in a reverse direction of propagation, whereby light leaving the Faraday rotator in said reverse direction of propagation is blocked by said preceding polarization filter.

2. An optical device as claimed in claim 1, wherein at least one of the polarization filters is rotatable with respect to the Faraday rotator for optimum adjustment of isolation.

3. An optical device as claimed in claim 1, wherein the Faraday rotator is a strip waveguide.

4. An optical device as claimed in claim 3, wherein the strip waveguide comprises a magneto-optical crystal layer and a cladding layer, deposited on a substrate layer, where the width of the magneto-optical crystal layer is determined by a mask with a width of between approximately 5 and approximately 20 μm as used in an etch step for the magneto-optical crystal layer.

5. An optical device, comprising:

a Faraday rotator arranged along an optical axis of propagation and having an identifiable TE plane, a propagation constant $\beta_{TE}$ in the TE plane and a propagation constant $\beta_{TM}$ in a TM plane wherein $\beta_{TE}$ and $\beta_{TM}$ are unequal;

a preceding polarization filter located along the optical axis on one size of the Faraday rotator and having a first plane of polarization; and a succeeding polarization filter located along the optical axis on another side of the Faraday rotator and having a second plane of polarization and forming an angle δ with the first plane of polarization, wherein the TE plane of the Faraday rotator is oriented at an angle α with the first plane of polarization and 0<α<δ, wherein the angle α between the plane of polarization of the polarization filter preceding the Faraday rotator in the direction in which light is blocked and the TE plane of the Faraday rotator is determined substantially according to the following equation:

$$tg2\alpha = \frac{K}{\sqrt{K^2 + \left(\frac{\Delta\beta}{2}\right)^2}} \cdot tg\left(L\sqrt{K^2 + \left(\frac{\Delta\beta}{2}\right)^2}\right)$$

with

K=coupling constant in degrees·cm$^{-1}$ $\Delta\beta = \beta_{TM} - \beta_{TE}$ in degrees·cm$^{-1}$ L=magneto-optically effective length of the Faraday rotator in cm, and that the angle between the planes of polarization of the polarization filters is chosen to be such that the plane of polarization of the succeeding polarization filter is perpendicular to the plane of polarization of the light rotated by the Faraday rotator, whereby the light leaving said other side of the Faraday rotator is blocked.

6. An optical device as claimed in claim 5, wherein at given values of K and Δβ, the nominal length L of the Faraday rotator is chosen to be such that the angle between the plane of polarization of the preceding polarization filter and the TE plane of the Faraday rotator has a value of between approximately 20° and 25°.

7. An optical device as claimed in claim 5, wherein at least one of the polarization filters is rotatable with respect to the Faraday rotator for optimum adjustment of isolation.

8. An optical device as claimed in claim 5, wherein the Faraday rotator is a strip waveguide.

9. An optical device as claimed in claim 8, wherein the strip waveguide comprises a magneto-optical crystal layer and a cladding layer, deposited on a substrate layer, where the width of the magneto-optical crystal layer is determined by a mask with a width of between approximately 5 and 20 μm as used in an etch step for the magneto-optical crystal layer.

\* \* \* \* \*